R. H. ROSENBERG.
DRIVING GEARING FOR MOTOR VEHICLES.
APPLICATION FILED FEB. 14, 1912.
1,164,870.
Patented Dec. 21, 1915.
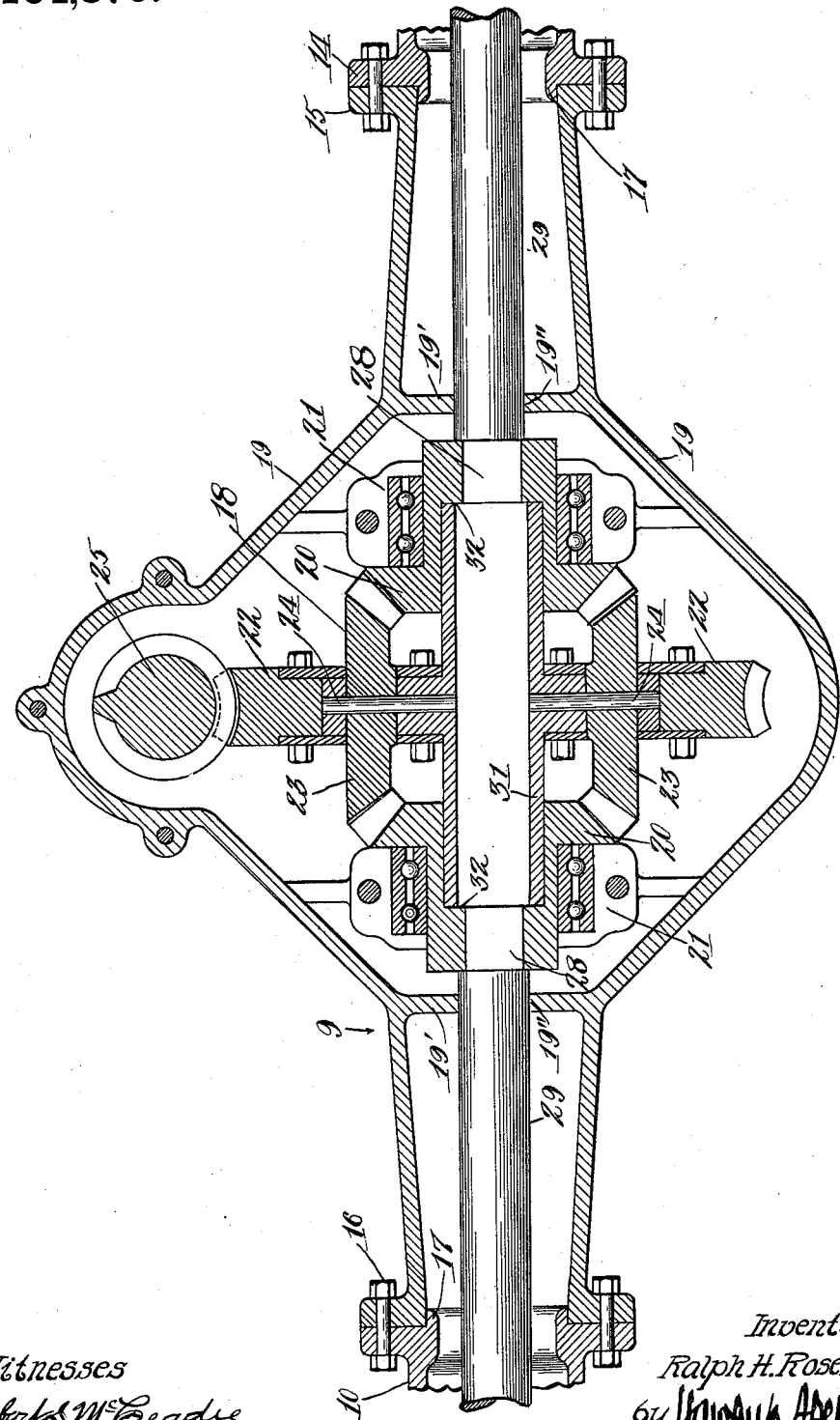
Witnesses
Robert McGeadie
Edward F. Wilson
Inventor
Ralph H. Rosenberg
by Hawley & Bellman
Attys.

UNITED STATES PATENT OFFICE.

RALPH H. ROSENBERG, OF COLUMBUS, OHIO, ASSIGNOR TO THE KINNEAR MANUFACTURING COMPANY, OF COLUMBUS, OHIO, A CORPORATION OF WEST VIRGINIA.

DRIVING-GEARING FOR MOTOR-VEHICLES.

1,164,870.  Specification of Letters Patent.   Patented Dec. 21, 1915.

Application filed February 14, 1912. Serial No. 677,554.

*To all whom it may concern:*

Be it known that I, RALPH H. ROSENBERG, a citizen of the United States, and a resident of Columbus, Ohio, have invented certain new and useful Improvements in Driving-Gearing for Motor-Vehicles, of which the following is a specification.

My invention relates to improvements in automobiles and has particular reference to driving axles for such vehicles.

The object of my invention is to lessen the first or manufacturing cost, to reduce the labor required for assembling and disassembling the axles and frame of the automobile and to provide a driving axle, parts of which can be interchangeably used with either steering or non-steering wheels.

A further object of my invention is to provide an axle which will facilitate inspection and repair of the differential mechanism which forms a part thereof.

A further object of my invention is to provide a driving axle so formed and connected to the vehicle that the power transmitting parts thereof can be easily and quickly removed and replaced without disconnecting or disturbing the load carrying springs.

My invention consists in the combination of parts by which the above and other objects are attained and all as hereinafter described and pointed out in the claim.

My invention will be readily understood by reference to the accompanying drawing, the view thereof illustrating a longitudinal central section of the middle portion of my improved axle, and mechanism and fragments of shafts therein contained, the latter being in full lines.

Generally speaking my improved axle is what is known as a live axle, that is, it has a casing as at 9—19 within which are mounted the mechanism and shafts by means of which power is transmitted to the road wheels of the vehicle. This casing is divided into several sections, the gear housing or casing 19 and two middle sections 9 and an end section 10 at each end thereof. The end sections 10 may, if desired and as well understood, be formed for connection with wheels which are driving only, or for connection with wheels which are both driving and steering wheels. The inner ends of the end sections are provided with circumferential bolting flanges 14 and the center sections are long enough to fill in between the opposed bolting flanges of the end sections. The center sections 9 are always substantially identical and each thereof is provided on its ends with bolting flanges 15 which are companion to the bolting flanges carried by the end sections and the center sections are bolted to the end sections by means of a plurality of clamping bolts 16 which pass through both of the flanges. In order to maintain the center and end sections in proper alinement, the end sections are provided with doweling flanges 17 which project within the outer ends of the center section.

The center section of the axle carries within the gear casing the differential gearing 18. In the drawing I have illustrated this differential gearing as being what may be termed a worm gear differential which is inclosed in the housing or casing 19 forming part of the center section 9 of the axle. This differential gearing as illustrated consists of a pair of opposed bevel wheels 20 mounted in bearings 21 in the casing 19, a worm wheel 22 centrally mounted in relation to said bevel wheels and carrying a pair of bevel wheels 23 mounted on radial bearing pins 24 and meshing with the bevel gears 20. The worm wheel is driven by means of a worm 25 mounted in bearings in the upper part of the casing 19 and connected to the engine through a horizontal shaft 26 which is provided with suitable universal joints 27. The bevel gears 20 are provided with square centrally arranged openings 28 for receiving the inner ends of the driving axles 29. The casing 19 is provided with a transverse flange or partition 19' which closes the center or gear containing portion at each end and each thereof is provided with an opening 19'' in central alinement with the square opening 28 in the hub of the adjacent bevel wheel 20. This opening is slightly larger than the inner end of the driving shaft 29 and serves to guide the end of this shaft when it is being entered into the square hole in the hub of the bevel wheel 20. These shafts extend outwardly through the hollow axle and are suitably connected with the driving or road wheels (not shown). The worm wheel 22 is mounted or carried upon a centrally arranged sleeve 31 which extends within and is carried by the bevel wheels 20. This sleeve contacts at each end with a shoulder 32 within each bevel wheel and the bevel wheels are prevented from separating by the bearings 21 against which they contact and within which they are mounted. This construction permits the driving shafts 29 to be removed from the axles or housings without disturbing the relation of the various parts of the differential mechanism. In other words, the shafts can be withdrawn with their wheels and the hollow axle carrying the various gears left intact. It will be evident that when the driving axles or shafts 29 are removed, the center section can be easily and readily separated from the end sections by simply removing the bolts 16 and dropping the center section out of its position. In this operation it will be necessary, of course, to spring asunder the end sections sufficiently to disengage the center sections from the dowel flanges 17.

An important advantage of my improvement consists in the facility with which axles can be manufactured for building automobiles.

The center sections are duplicates of each other and can be made up in quantities without regard to the form of end sections which will finally be associated therewith.

When it is necessary or desirable to remove the gear carrying center section of the axles for inspection or repairs or for replacement by another, this can readily be done without dismantling the automobile as it is only necessary to block up the automobile upon the end sections and unbolt and remove the center sections.

As many modifications of my invention will readily suggest themselves to one skilled in the art, I do not limit or confine my invention to the specific structures herein shown and described.

I claim:

Driving gearing for motor vehicles including, in combination, a casing forming a portion of the axle of the vehicle, opposed bearings formed in said casing, differential gear members 20 having hubs turning in said bearings, drive shafts, said differential gear members 20 having sockets for the longitudinally removable operable connection of the drive shafts therewith, a sleeve 31 extending between and turning in said gear members 20, radial pins 24 on said sleeve, differential gear members 18 on said pins meshing with the gear members 20, a large gear 22 carried on said sleeve and means for applying power to the same, substantially as described.

In testimony whereof, I have hereunto set my hand, this 26 day of January, 1912, in the presence of two subscribing witnesses.

RALPH H. ROSENBERG.

Witnesses:
ROBERT H. COCHRAN,
EDWARD H. MCCLOUD.

Copies of this patent may be obtained for five cents each, by addressing the "Commissioner of Patents, Washington, D. C."